(12) United States Patent
Mowery et al.

(10) Patent No.: US 6,984,152 B2
(45) Date of Patent: Jan. 10, 2006

(54) MULTIFUNCTION PASSIVE SOCKET FOR FLASH MEDIA CARDS

(75) Inventors: Keith Mowery, Plano, TX (US); Daniel Jensen, Plano, TX (US); Takeshi Sakai, Richardson, TX (US); Cheng-Kun Huang, Taipei (TW)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/251,333

(22) Filed: Sep. 20, 2002

(65) Prior Publication Data

US 2003/0082961 A1    May 1, 2003

Related U.S. Application Data

(60) Provisional application No. 60/335,515, filed on Oct. 30, 2001.

(51) Int. Cl.
*H01R 25/00* (2006.01)
*H01R 27/02* (2006.01)
*H01R 31/00* (2006.01)
*H01R 33/88* (2006.01)
*G06F 13/00* (2006.01)

(52) U.S. Cl. .................................. 439/638; 710/301

(58) Field of Classification Search ............... 439/488, 439/638, 639, 650; 710/305, 301, 302, 303; 235/441
See application file for complete search history.

(56) References Cited

U.S. PATENT DOCUMENTS 6,438,638 B1    8/2002  Jones et al.
2003/0038177 A1 *  2/2003  Morrow ..................... 235/441

* cited by examiner

Primary Examiner—Chandrika Prasad
(74) Attorney, Agent, or Firm—William B. Kempler; W. James Brady, III; Frederick J. Telecky, Jr.

(57) ABSTRACT

The present invention enables the use of a single passive socket for multiple types of flash media cards. The present invention provides this by implementing circuitry with a detection scheme (1410, 1610) that notifies a host controller of the type of media card that has been inserted. The form factors and detection scheme can be designed to meet PCMCIA CardBus Plus standards.

23 Claims, 12 Drawing Sheets

| QRYx PIN | FUNCTION |
|---|---|
| 10-7 | RESERVED (CONNECT TO GROUND) |
| 6-3 | INTERFACE IMPLEMENTATION |
| 2-1 | CARD VOLTAGE |

FIG. 6A

| QRY2 | QRY1 | CARD VOLTAGE |
|---|---|---|
| 0 | 0 | $V_{CC} = 3.3V$, $V_{PP}/V_{CORE} = 1.8V$ |
| 0 | 1 | $V_{CC} = 5V$, $V_{PP} = 0V$ |
| 1 | 0 | OPTION B |
| 1 | 1 | OPTION C |

FIG. 6B

| QRY6 | QRY5 | QRY4 | QRY3 | INTERFACE IMPLEMENTATION |
|---|---|---|---|---|
| 0 | 0 | 0 | 0 | USB INTERFACE |
| 0 | 0 | 0 | 1 | SmartMedia INTERFACE |
| 0 | 0 | 1 | 0 | SD/MMC INTERFACE |
| 0 | 0 | 1 | 1 | MEMORY STICK INTERFACE |
| 0 | 1 | 0 | 0 | SMART CARD INTERFACE |
| 0 | 1 | 0 | 1 | RESERVED |
| 0 | 1 | 1 | X | RESERVED |
| 1 | X | X | X | RESERVED |

FIG. 6C

| CONFIGURATION | MS_CD LINE | SM_CD LINE | SD/MMC_CD LINE |
|---|---|---|---|
| NO CARD INSERTED | SWITCH OPEN (FLOAT) | SWITCH OPEN (FLOAT) | SWITCH OPEN (FLOAT) |
| MEMORY STICK INSERTED | SWITCH CLOSED (GND) | SWITCH OPEN (FLOAT) | SWITCH OPEN (FLOAT) |
| SD/MMC CARD INSERTED | SWITCH OPEN (FLOAT) | SWITCH OPEN (FLOAT) | SWITCH CLOSED (GND) |
| SMART MEDIA CARD INSERTED | SWITCH OPEN (FLOAT) | SWITCH CLOSED (GND) | SWITCH OPEN (FLOAT) |

MULTIFUNCTION PASSIVE SOCKET FOR FLASH MEDIA CARDS

This application claims the priority under 35 U.S.C. § 119(e)(1) of U.S. provisional application No. 60/335,515 filed on Oct. 30, 2001, now abandoned, and incorporated herein by reference. This application discloses subject matter that is related to the subject matter disclosed in U.S. Ser. No. 10/251,334 filed concurrently herewith.

FIELD OF THE INVENTION

The invention relates generally to electronic device adaptors and, more particularly, to a multifunction passive socket for flash media cards.

BACKGROUND OF THE INVENTION

The demand for personal computers and related equipment continues to expand due to a number of factors. One important factor is that the prices of computers continue to decline. Another factor is the expansion and development of the Internet and related network communications. Increasingly, commercial and non-commercial enterprises are conducting business via the Internet and consumers need personal computers to gain access to the products and information that are available on the Internet. In addition to being more affordable, advances in computer application software, operating systems and communications software has fueled the development of computers having greater processing speeds and capacities. At the same time, the pressure to at least maintain, or preferably reduce, the physical size of the computer has increased as well. Accordingly, downsizing and miniaturization of computer components is an issue of great importance in the industry.

In an effort to reduce the form factor of the typical personal computer, and yet expand the capabilities of that computer, manufacturers began to develop miniature portable expansion devices having smaller sizes, such as add-on memory cards and modems. The typical expansion device was designed to plug into a port or socket on the main computer; thus the expansion device served to expand the capability of the computer without significantly increasing the size of the computer's physical envelope.

While the development of portable expansion devices represented a significant advance in the capabilities of personal computers, one drawback of many of the devices was that they were designed to fit only one manufacturer's computer, and thus were not interchangeable between platforms. The industry recognized that standardization of these devices would, among other things, greatly increase the demand for them. To this end, several manufacturers collaborated to form the Personal Computer Memory Card International Association (PCMCIA). This body develops and promulgates standards for the physical design, dimensions, and electrical interface of expansion devices. Now, many computers being manufactured, especially those having a reduced size, such as notebooks, have been adapted to accommodate these standards.

PCMCIA cards have become very popular because of their relatively small size, interchangeability, and capability. However, as a result of the relentless drive for smaller and more capable computers, the industry developed a new generation of expansion devices with an even smaller form factor than that of PCMCIA cards. The new expansion devices, or cards, are sometimes referred to as "compact flash" or "miniature flash" cards. Some examples of the new devices include SmartCard, SmartMedia (SSFDC), Memory Stick, and MultiMediaCard (MMC) and Secure Digital (SD) Flash. These compact devices have a very small "form factor" or physical size. SmartCards are about the same size as a credit card. SmartMedia cards are about one-third the size of a standard PC card and only 0.76 mm thick. Memory Stick cards are about the size of a stick of gum and are 2.8 mm thick. MMC and SD cards are about the size of a postage stamp. MMC cards are 1.4 mm thick, while SD cards are slightly thicker, about 2.1 mm think. In contrast, a typical card built to PCMCIA standards is about 86 mm long by 54 mm wide.

Until recently, there were only two (2) ways for a user to access a media card, depending on the system implementation. The most common way was through the use of an adaptor card that contains logic to translate from the media card interface to the PC card interface. This method was good in that it used the existing PC card slot on the notebook. However, these adaptor cards were very expensive because of the translation logic on the adaptor card. FIG. 1 diagrammatically illustrates a system 100 with a media card adaptor 110 that contains its own controller 120 in accordance with the art. Media card 115 is inserted into media card adaptor 110. The combination is then inserted into card slot 105. The other method was for the system to have a slot specifically dedicated to the media card. In such a system, the media card controller was either a dedicated chip or a separate function of an existing chip. The problem with this method was that the system must have additional space for the separate chip and media card slot. Since there are several different types of media cards available, this solution was undesirable because it restricted the user to a certain type of media card. FIG. 2 diagrammatically illustrates a system 200 with a dedicated media card slot 210 and controller 220 in accordance with the art. While other cards 225 are inserted into card slot 105, media card 215 is inserted into dedicated media card slot 210. Each different type of media card 215 would require its own dedicated media card slot 210 and controller 220. If a consumer had, for example, four (4) different types of media cards 215, the consumer's notebook would have to have four (4) different media card slots 210 with each with its own controller 220 in order for the consumer to use all four (4) media cards 215.

The PCMCIA has now developed CardBus Plus, defining a new way to interface several flash media and smart cards using the PCMCIA sockets that have become standard on notebook computers. Primarily, CardBus Plus integrates the media card translation logic onto the existing PC card controller inside the notebook. This allows for inexpensive, passive adaptors for the media cards. Although all passive adaptor cards will use the same form factor as existing 16-bit and CardBus cards, the card detect logic in the controller will determine if the inserted card is a 16-bit card, a CardBus card or a passive adaptor. The controller will then route the appropriate signals to a 68-pin PC card interface. FIG. 3 diagrammatically illustrates a passive adaptor system 300 with its media card logic 320 on an existing PC card controller 330 internal to a notebook in accordance with the art. Media card 315 is inserted into passive adaptor 310. The combination is then inserted into card slot 105. Card slot 105 would be capable of accommodating all cards with form factors that match existing 16-bit and CardBus cards.

Utilizing the CardBus Plus approach, a passive adaptor can be used to interface a given type of flash media to the PC. Each type of flash media has its own passive adaptor. For example, to interface a SmartCard to a notebook, a SmartCard can be inserted into a SmartCard passive adaptor which is then inserted into the notebook's existing PCMCIA socket (a single common port). As compared to other adaptors, a passive adaptor is very low cost. FIG. 4 diagrammatically illustrates a conventional PCMCIA card 400, with a portion of its casing removed, in accordance with the art. It can be seen from FIG. 4 that there are a number of different components, such as ICs, resistors and voltage regulators, that comprise PCMCIA card 400. These different components increase the cost of PCMCIA cards. By comparison, FIG. 5 diagrammatically illustrates a conventional passive adaptor 310 in accordance with the art. Passive adaptor 310 is basically comprised of signal traces routed to a connector. While passive adaptor 310 may still use some diodes and resistors, the cost of a passive adaptor, such as passive adaptor 310, is much less than the cost of non-passive media, such as PCMCIA card 400.

Although CardBus Plus standardized the use of passive adaptors, it still left at least one major problem. As noted above, each type of flash media card requires its own dedicated passive adaptor. This means that if, for example, a consumer has four (4) different types of flash media cards, the consumer will also need four (4) different passive adaptors in order to use all four (4) flash media cards with a notebook.

It is therefore desirable to provide a solution that enables the use of a single passive socket for multiple types of flash media cards. The present invention provides this by implementing circuitry with detection schemes that notify the host's controller of the type of media card that has been inserted. This circuitry and detection schemes can be designed to meet PCMCIA CardBus Plus standards.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which:

FIGS. 6A, 6B and 6C illustrate tables listing passive adaptor query pin definitions and assignments in accordance with PCMCIA standards;

FIG. 8 diagrammatically illustrates an exemplary embodiment of a 4-to-1 card detection scheme in accordance with the present invention;

DETAILED DESCRIPTION

While the making and using of various embodiments of the present invention are discussed herein in terms of specific detection implementations and form factors, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention enables the use of a single passive socket for multiple types of flash media cards. The present invention provides this by implementing circuitry with detection schemes that notifies a host controller of the type of media that has been inserted. This circuitry and detection schemes are designed to meet PCMCIA CardBus Plus standards.

Figure 7:
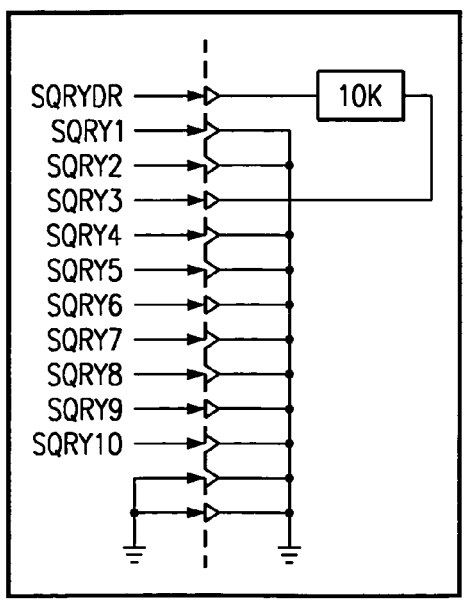
FIG. 7 diagrammatically illustrates an exemplary query pin configuration for a 3.3 V $V_{CC}$ and a 1.8 V $V_{core}$ passive adaptor with a SmartMedia Interface in accordance with PCMCIA standards.

According to PCMCIA CardBus Plus standards, passive adaptors will include ten (10) query pins and a query driver pin. A PC card controller reads the state of two (2) Media Card Card insertion detect pins (MC_CD# and MC_CD#2) in order to determine if a passive adaptor has been inserted into a host computer and if a media card is in the inserted passive adaptor., MC_CD#2 will be asserted high until a passive adaptor has been inserted into the host computer. MC_CD# will be asserted high until a media card is inserted into the passive adaptor. After detecting the presence of a media card, the PC card controller will drive a '1' on the query driver pin and read the query pins. The query pins will be connected either to the driver pin or to ground to indicate the functionality and interfaces of the passive adaptor. Query pins will be switched to ground after being read. If a passive adaptor is inserted into a system that does not support passive adaptors, the passive adaptor will be detected as a "Reserved/Unknown" card. PCMCIA CardBus Plus standards define and assign the query pins as shown in FIGS. 6A, 6B and 6C. If a '1' value is needed for a query pin, that pin will be connected to the query driver pin. If a '0' value is needed for a query pin, that pin will be connected to ground. FIG. 7 illustrates an exemplary query pin configuration for a 3.3 V $V_{cc}$ and a 1.8 V $V_{core}$ passive adaptor with a SmartMedia Interface in accordance with PCMCIA CardBus Plus standards. According to FIG. 6B, the configuration for a 3.3 V $V_{cc}$ and a 1.8 V $V_{core}$ passive adaptor requires a '0' value for QRY1 and QRY2. In FIG. 7, SQRY1 and SQRY2 are connected to ground, resulting in a '0' value for each query pin. A SmartMedia Interface, according to FIG. 6C, requires a '0' value for QRY4, QRY5 and QRY6 and a '1' value for QRY3. In FIG. 7, SQRY4, SQRY5 and SQRY6 are connected to ground, resulting in a '0' value for each query pin. SQRY3 in FIG. 7 is connected to the query pin driver, SQRYDR, resulting in a '1' value. According to FIG. 6A, query pins 10-7 are reserved and should be connected to ground. In FIG. 7, SQRY7 through SQRY10 are connected to ground. In order to protect the PC controller bus driver from shorts when the query pins are switched back to ground, a series resistor is implemented in the SQRYDR signal line before interfacing to any of the query pins.

The passive socket of the present invention operates in accordance with PCMCIA CardBus Plus standards. However, the passive socket of the present invention enables access to multiple types of flash media rather than just a single type. For purposes of this discussion, use of the conventional Media Card Card insertion detect pin which indicates the presence of a passive adaptor in a host computer is assumed, although not explicitly shown. FIG. 8 diagrammatically illustrates an exemplary embodiment of a 4-to-1 card detection circuit 1410 in accordance with the present invention. The exemplary card detection scheme of FIG. 8 enables a single passive adaptor to accommodate cards such as SmartMedia, SD/MMC, and Memory Stick, as well as indicating that no media card has been inserted in the passive adaptor. FIG. 8 includes a conventional Media Card Card insertion detect pin (MC_CD#) for use in determining whether or not a media card has been inserted into the passive adaptor. As long as MC_CD# is high, the host will recognize that an empty passive adaptor has been inserted and will not apply power to query pin driver SQRYDRV. If a media card has been inserted into the passive adaptor, MC_CD# should be asserted low. The exemplary detection scheme of FIG. 8 provides a mechanism for driving MC_CD# low if any of the media cards have been inserted. When a media card has been inserted into the passive adaptor, a corresponding card insertion detect switch, for example, SD/MMC_CD, SM_CD or MS_CD, will be closed, thereby grounding a corresponding node of card detection circuit 1410. Additionally, the corresponding card insertion detect switch will be connected to MC_CD# either directly or via diodes 810 and 820, thereby driving MC_CD# low. Diode 860, in the signal line between SQRY3 and SD/MMC_CD, isolates SQRY3. Diode 870, in the signal line between SQRY4 and SM_CD, isolates SQRY4. By grounding a card insertion detect switch either two (2) diodes (e.g., diodes 810 and 860 when SD/MMC_CD is grounded or diodes 820 and 870 when SM_CD is grounded) are activated, or MC-CD# is grounded (e.g., when MS_CD is grounded). This allows for the proper configuration at SQRY3, SQRY4 and MC_CD#. As can be seen from FIG. 6C, QRY5 and QRY6 require a '0' value for SmartMedia, SD/MMC and Memory Stick. In FIG. 8, SQRY5 and SQRY6 are both tied to ground 850, resulting in a '0' value for each. Series resistors 830 and 840, in the signal lines from SQRYDRV to SQRY3 and SQRY4, respectively, protect the host controller bus driver from shorts when SQRY3 and SQRY4 are switched back to ground. Series resistor 880, in the signal line from MC_CD# to $V_{CC}$, provides similar protection when MC_CD# changes states. An exemplary value for series resistors 830, 840 and 880 would be 10 kΩ each. The query driver (SQRYDRV), the query pins (SQRY3, SQRY4, SQRY5 and SQRY6), the Media Card Card insertion detect pin (MC_CD#), series resistor 880, and $V_{CC}$ can be on the host side. Diodes 810, 820, 860 and 870 and series resistors 830 and 840 form the detection circuit of the adaptor.

Figure 9:
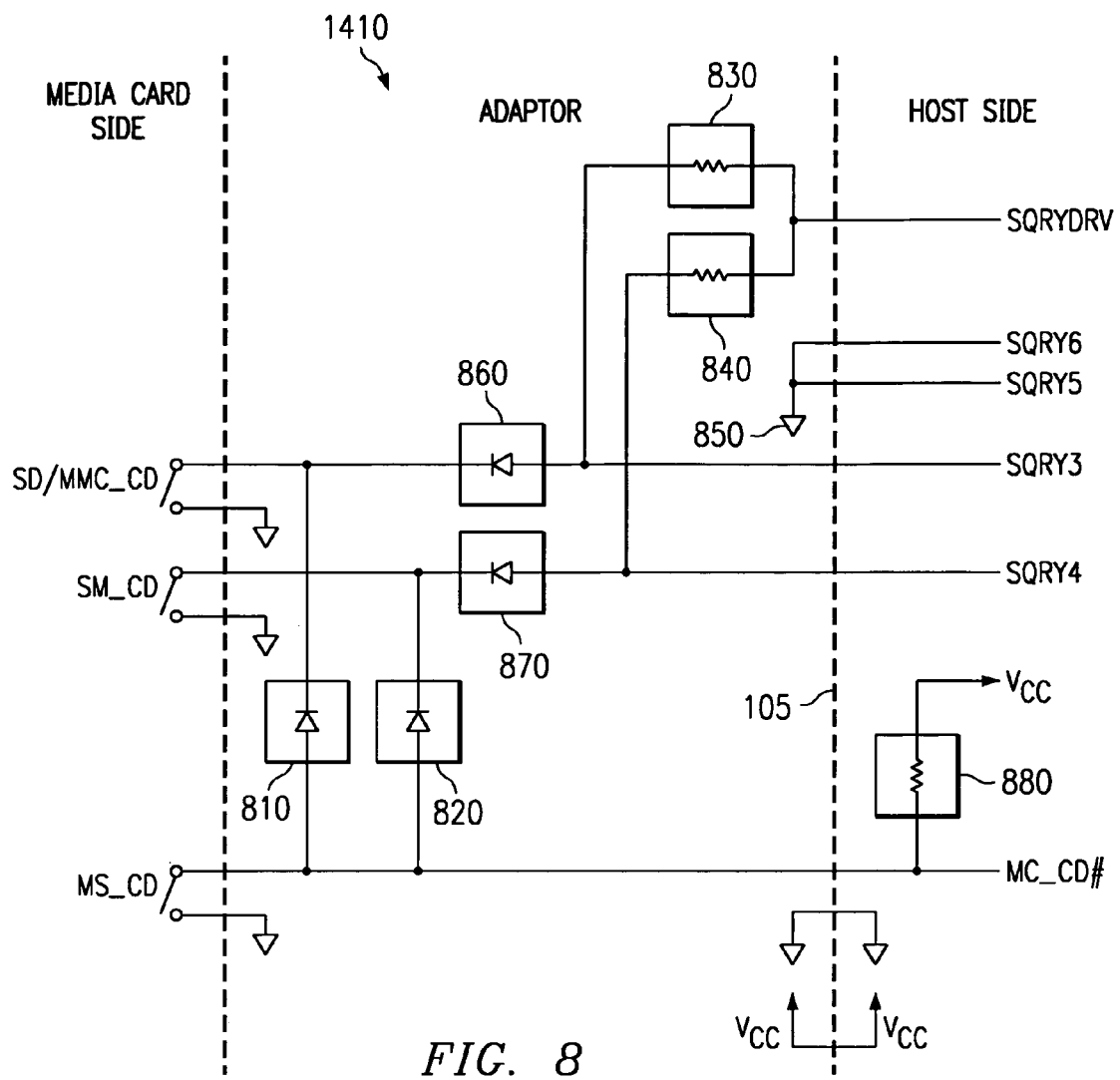
FIG. 9 illustrates a table of exemplary card detection configuration options in accordance with the present invention.

FIG. 9 illustrates a table of exemplary card detection configuration options in accordance with the present invention. When no media card has been inserted in the passive adaptor, card insertion detect switches MS_CD, SM_CD, and SD/MMC_CD are all open, as indicated in the first row ("No Card Inserted" row) of FIG. 9. When a Memory Stick has been inserted in the passive adaptor, the Memory Stick card insertion detect switch (MS_CD) is closed (grounded). This is indicated in the first column ("MS_CD Line" column) of the second row ("Memory Stick Inserted" row) of FIG. 9. In the third row ("SD/MMC Card Inserted" row) of FIG. 9, "Switch Closed (GND)" is entered in the last column ("SD/MMC_CD Line" column), thereby indicating that the Secure Digital/MultiMediaCard card insertion detect switch (SD/MMC_CD) has been closed (grounded) to register the insertion of an SD/MMC card into the passive adaptor. When a SmartMedia card has been inserted in the passive adaptor, the SmartMedia card insertion detect switch (SM_CD) is closed (grounded). Accordingly, the last row ("Smart Media Card Inserted" row) of FIG. 9 contains "Switch Closed (GND)" in the second ("SM_CD Line" column). FIGS. 10–13 illustrate exemplary implementations of the card detection configuration options of FIG. 9.

Figure 10:
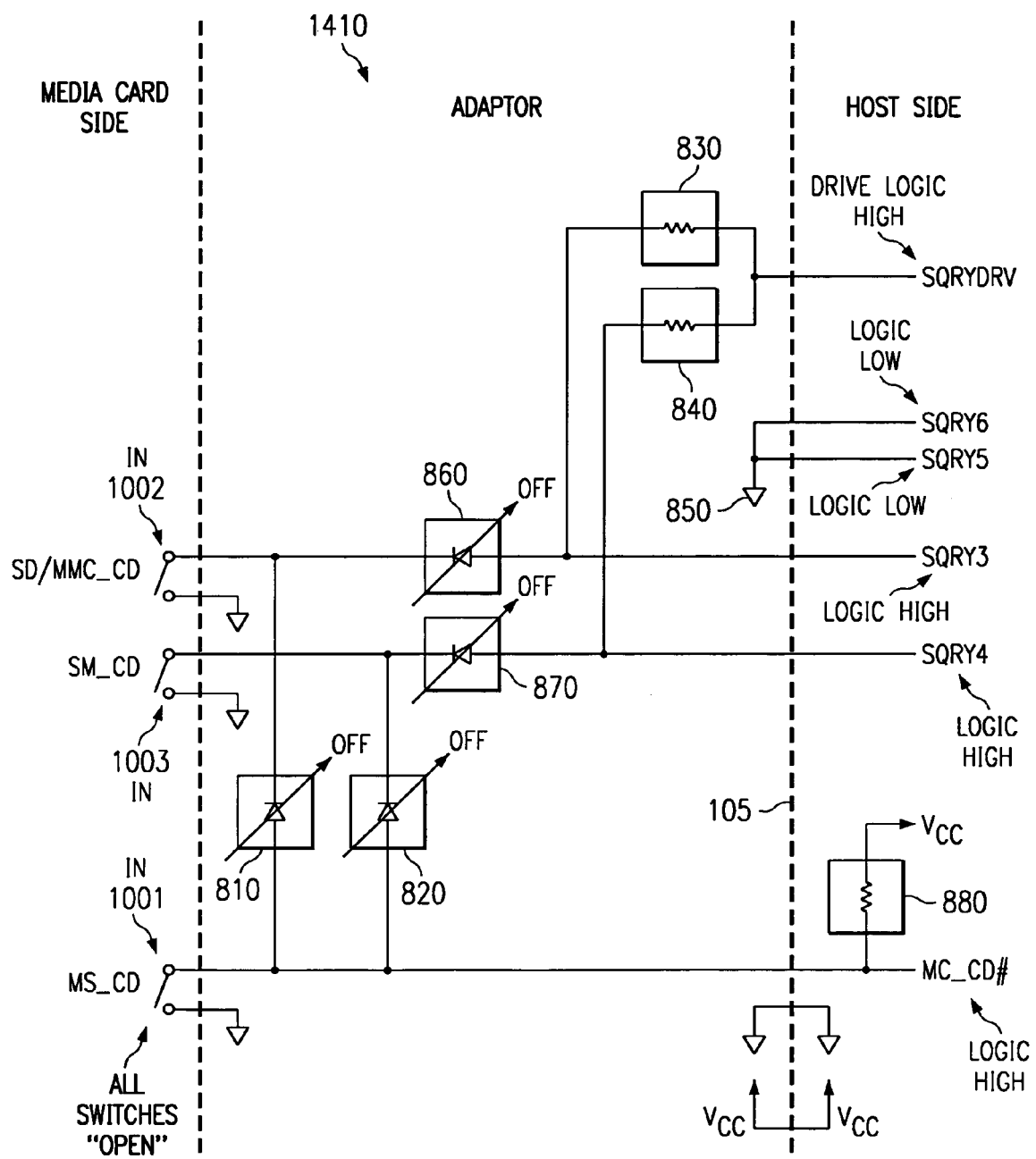
FIG. 10 diagrammatically illustrates an exemplary embodiment of a 4-to-1 card detection scheme registering the presence of an inserted adaptor without a media card in accordance with the present invention.

FIG. 10 diagrammatically illustrates an exemplary embodiment of a 4-to-1 card detection scheme registering the presence of an inserted adaptor without a media card in accordance with the present invention. The three (3) card insertion detect switches, MS_CD, SM_CD, and SD/MMC_CD are open. The card insertion detect pin, MC_CD#, is at a logic high. This diagrammatically illustrates the first row ("No Card Inserted" row) of FIG. 9. Diodes 810, 820, 860 and 870 are "Off." A host controller would read the state of MC_CD#, which is at a logic high, and recognize that no media card had been inserted into the passive adaptor. Therefore, the host controller would not apply power to query pin driver SQRYDRV.

Figure 11:
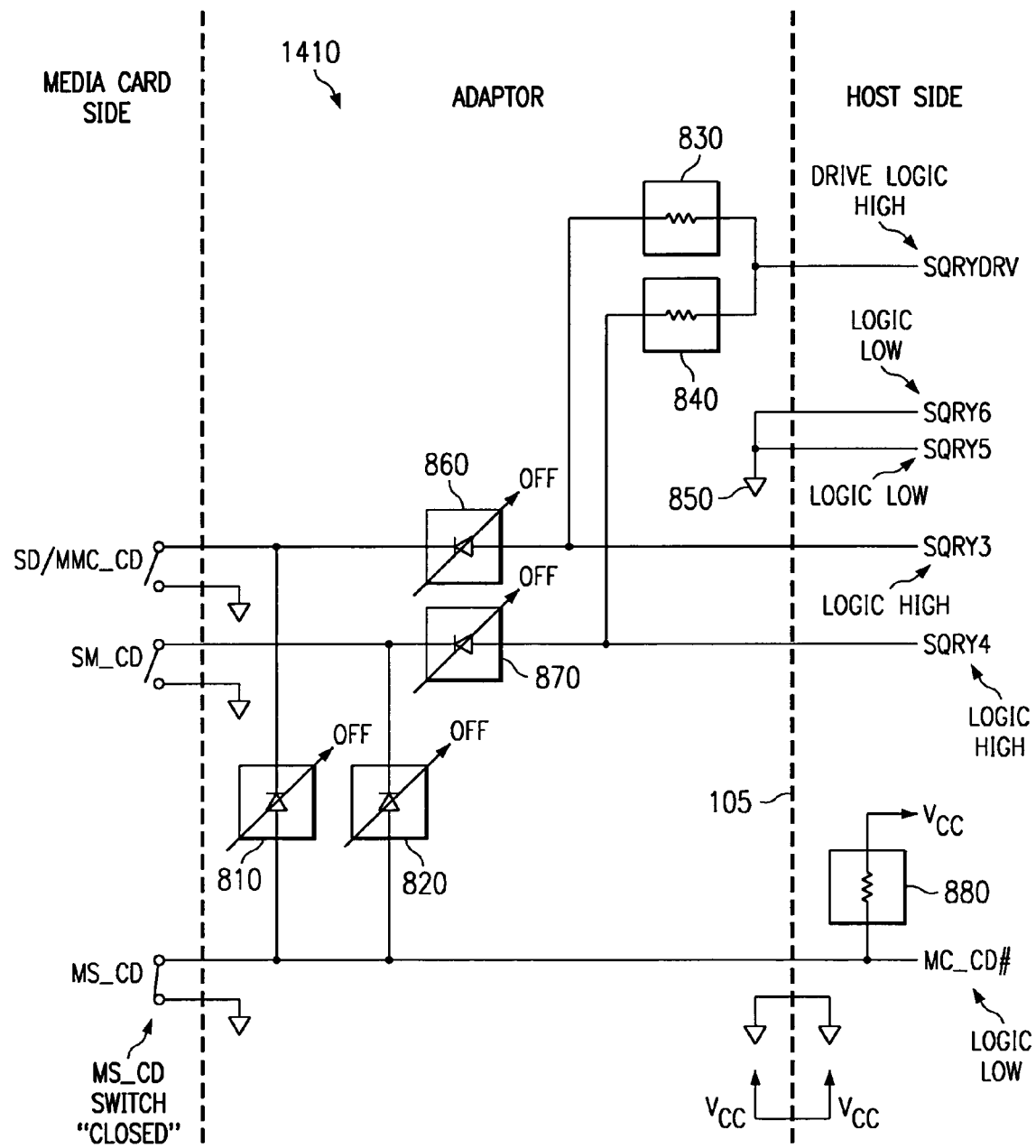
FIG. 11 diagrammatically illustrates an exemplary embodiment of a 4-to-1 card detection scheme registering the presence of an inserted adaptor with a Memory Stick card in accordance with the present invention.

FIG. 11 diagrammatically illustrates an exemplary embodiment of a 4-to-1 card detection scheme registering the presence of an inserted adaptor with a Memory Stick card in accordance with the present invention. The second row ("Memory Stick Inserted" row) of FIG. 9, indicates that the MS_CD card insertion detect switch should be closed (grounded) to indicate the presence of a Memory Stick in an inserted passive adaptor, while the remaining card insertion detect switches should be open. This is illustrated in FIG. 11. Diodes 810 and 820 are "Off" because MC_CD# is directly connected to MS_CD. Therefore, when MS_CD is closed (grounded), MC_CD# will be driven to a logic low. In this case, the host will recognize that a passive adaptor with a media card has been inserted and will drive SQRYDRV to a logic high. A Memory Stick Interface, according to FIG. 6C, requires a '0' (or low) value for QRY5 and QRY6 and a '1' (or high) value for QRY3 and QRY4. In FIG. 11, SQRY5 and SQRY6 are connected to ground 850, while SQRY3 and SQRY4 are connected to SQRYDRV through series resistors 830 and 840, respectively. Additionally, card insertion detect switches, SM_CD and SD/MMC_CD, are open, while diodes 860 and 870 are "Off." Therefore, SQRY5 and SQRY6 are each at a logic low, while SQRY3 and SQRY4 are each at a logic high. This configuration tells the host controller that the inserted media card is a Memory Stick card.

Figure 12:
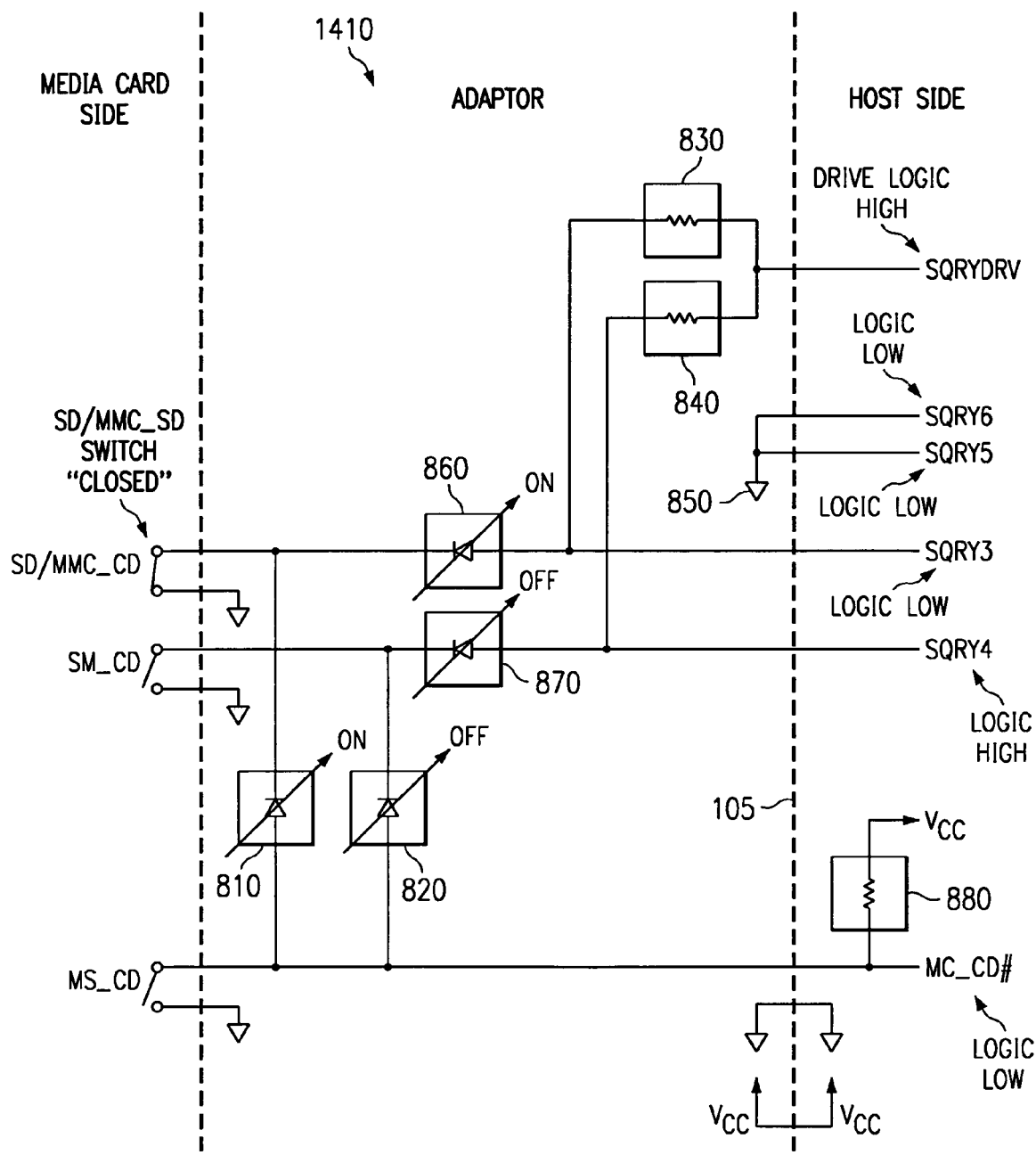
FIG. 12 diagrammatically illustrates an exemplary embodiment of a 4-to-1 card detection scheme registering the presence of an inserted adaptor with a Secure Digital/MultiMediaCard card in accordance with the present invention.

FIG. 12 diagrammatically illustrates an exemplary embodiment of a 4-to-1 card detection scheme registering the presence of an inserted adaptor with a Secure Digital/MultiMediaCard card in accordance with the present invention. The third row ("SD/MMC Card Inserted" row) of FIG. 9, indicates that the SD/MMC_CD card insertion detect switch should be closed (grounded) to indicate the presence of an SD/MMC card in an inserted passive adaptor, while the remaining card insertion detect switches should be open. This is illustrated in FIG. 12. Diode 820 is "Off." Diode 810 is "On," thereby connecting MC_CD# to the SD/MMC_CD card insertion detect switch which is closed (grounded). Therefore, MC_CD# will be driven to a logic low. In this case, the host will recognize that a passive adaptor with a media card has been inserted and will drive SQRYDRV to a logic high. An SD/MMC Interface, according to FIG. 6C, requires a '0' (or low) value for QRY3, QRY5 and QRY6 and a '1' (or high) value for QRY4. In FIG. 12, SQRY5 and SQRY6 are connected to ground 850, while SQRY3 and SQRY4 are connected to SQRYDRV through series resistors 830 and 840, respectively. Additionally, the MS_CD and SM_CD card insertion detect switches are open and diode 870 is "Off."

However, the SD/MMC_CD card insertion detect switch is closed (grounded) and diode 860 is "On," thereby driving SQRY3 to a logic low. Therefore, SQRY3, SQRY5 and SQRY6 are each at a logic low, while SQRY4 is at a logic high. A logic low can be, for example, one (1) diode drop above ground. This configuration tells the host controller that the inserted media card is an SD/MMC card.

Figure 13:
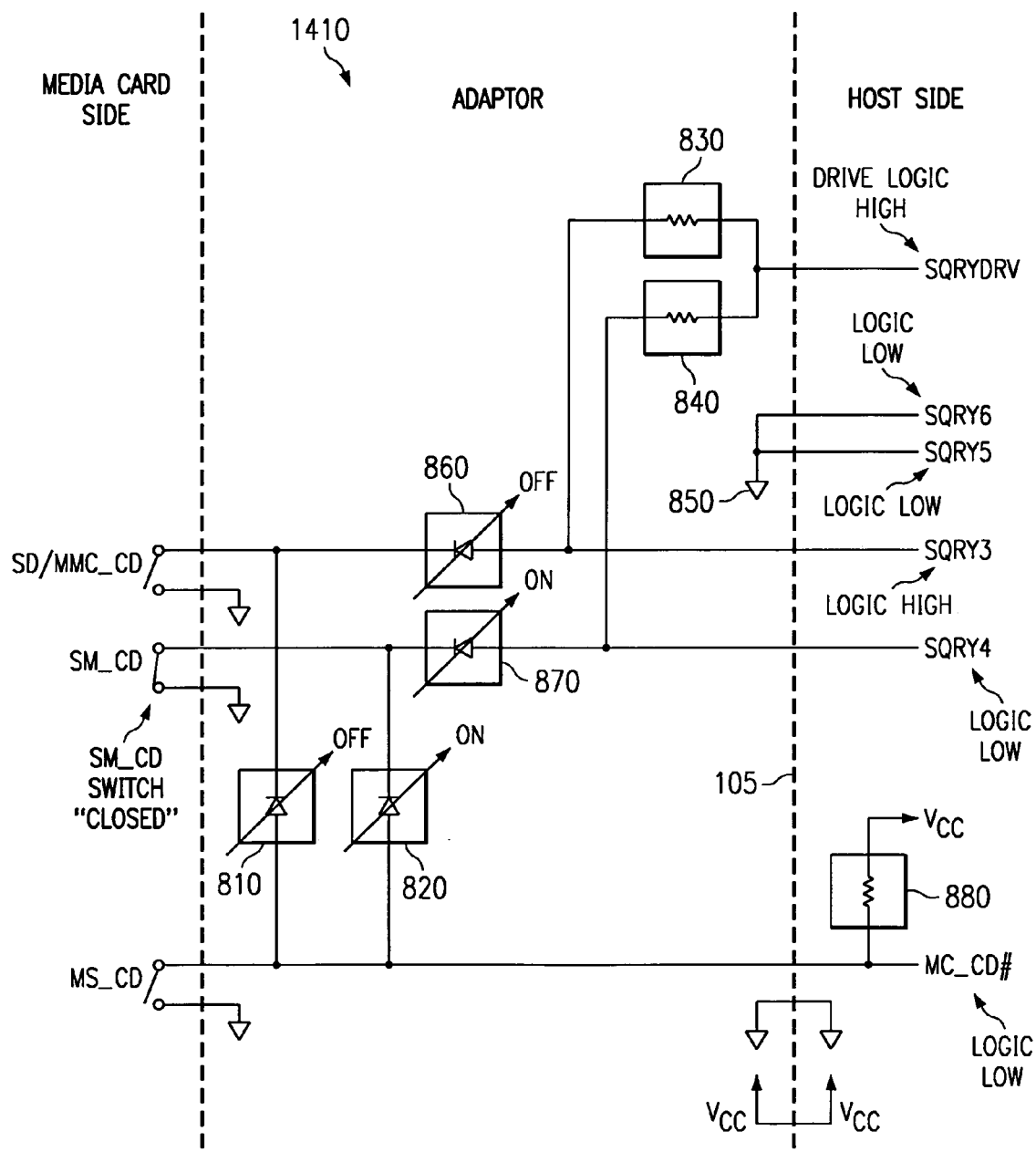
FIG. 13 diagrammatically illustrates an exemplary embodiment of a 4-to-1 card detection scheme registering the presence of an inserted adaptor with a SmartMedia card in accordance with the present invention.

FIG. 13 diagrammatically illustrates an exemplary embodiment of a 4-to-1 card detection scheme registering the presence of an inserted adaptor with a SmartMedia card in accordance with the present invention. The fourth row ("Smart Media Card Inserted" row) of FIG. 9, indicates that the SM_CD card insertion detect switch should be closed (grounded) to indicate the presence of a Smart Media card in an inserted passive adaptor, while the remaining card insertion detect switches should be open. This is illustrated in FIG. 13. Diode 810 is "Off." Diode 820 is "On," thereby connecting MC_CD# to the SM_CD card insertion detect switch which is closed (grounded). Therefore, MC_CD# will be driven to a logic low. In this case, the host will recognize that a passive adaptor with a media card has been inserted and will drive SQRYDRV to a logic high. A SmartMedia Interface, according to FIG. 6C, requires a '0' (or low) value for QRY4, QRY5 and QRY6 and a '1' (or high) value for QRY3. In FIG. 13, SQRY5 and SQRY6 are connected to ground 850, while SQRY3 and SQRY4 are connected to SQRYDRV through series resistors 830 and 840, respectively. Additionally, the SD/MMC_CD and MS_CD card insertion detect switches are open and diode 860 is "Off." However, the SM_CD card insertion detect switch is closed (grounded) and diode 870 is "On," thereby driving SQRY4 to a logic low. Therefore, SQRY4, SQRY5 and SQRY6 are each at a logic low, while SQRY3 is at a logic high. A logic low can be, for example, one (1) diode drop above ground. This configuration tells the host controller that the inserted media card is a SmartMedia card.

Figure 14:
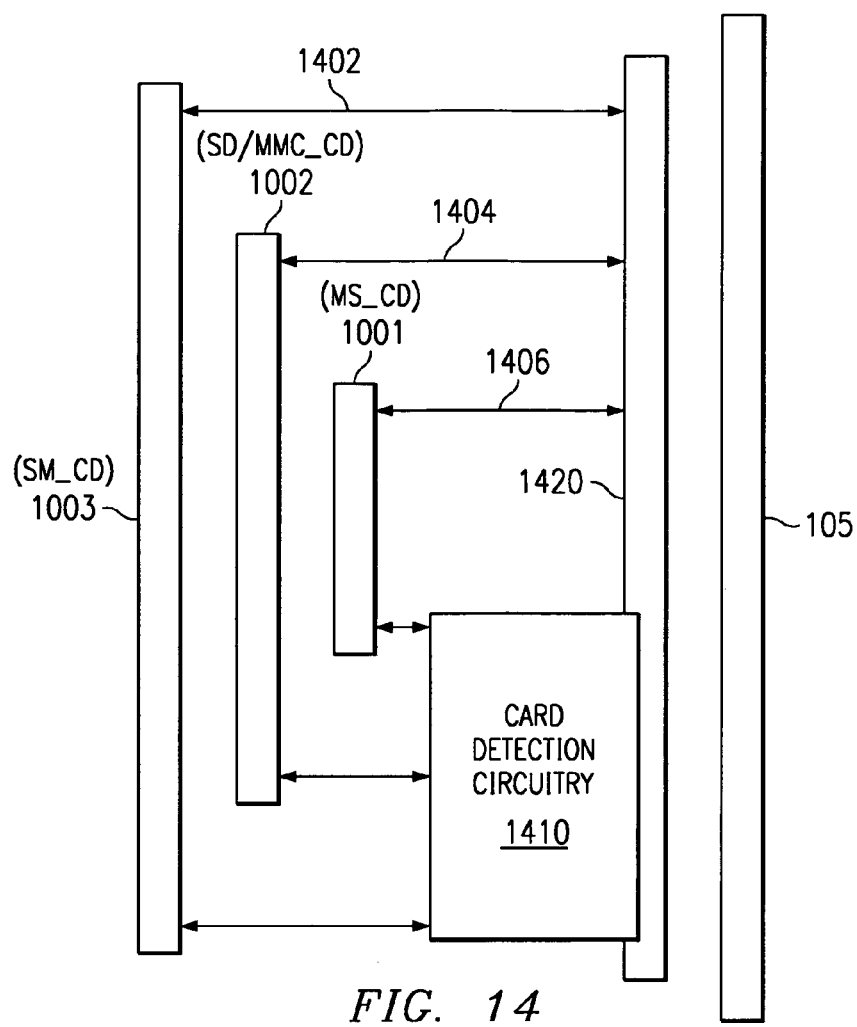
FIG. 14 diagrammatically illustrates an exemplary embodiment of a connection layout for 4-to-1 card detection scheme in accordance with the present invention.

In the exemplary passive adaptor embodiment illustrated in FIG. 14, connector 1420 can functionally connect the passive adaptor of the invention into a card slot, such as slot 105, of the host computer. The Memory Stick, SD/MMC and SmartMedia cards can be connected to the passive adaptor through respectively corresponding media card connectors 1001, 1002 and 1003. Although connectors 1001, 1002 and 1003 may not be functionally compatible with the host computer connector 105, they are interfaced to connector 105 by the aforementioned card detection circuitry 1410, by corresponding signal lines 1406, 1404 and 1402, respectively, and by connector 1420, which is cooperable with the host computer connector 105. Thus, the exemplary circuitry shown at 1410, 1402, 1404 and 1406 forms adaptor circuitry for interfacing the media cards to the host computer.

Figure 1:
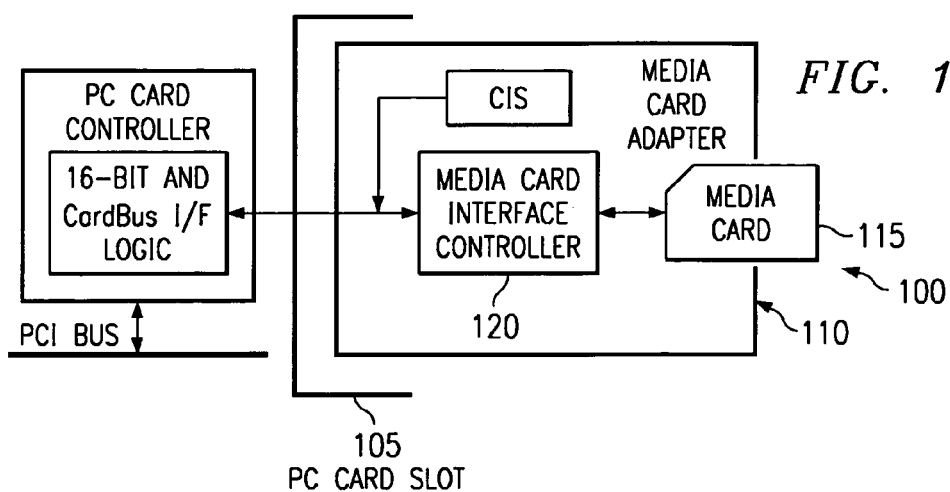
FIG. 1 diagrammatically illustrates a system with a media card adaptor that contains its own controller in accordance with the art.
Figure 2:
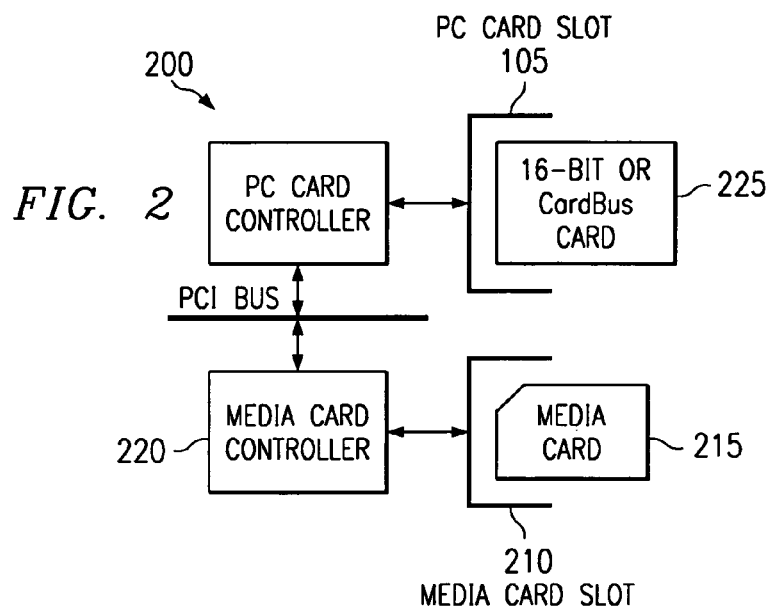
FIG. 2 diagrammatically illustrates a system with a dedicated media card slot and controller in accordance with the art.
Figure 3:
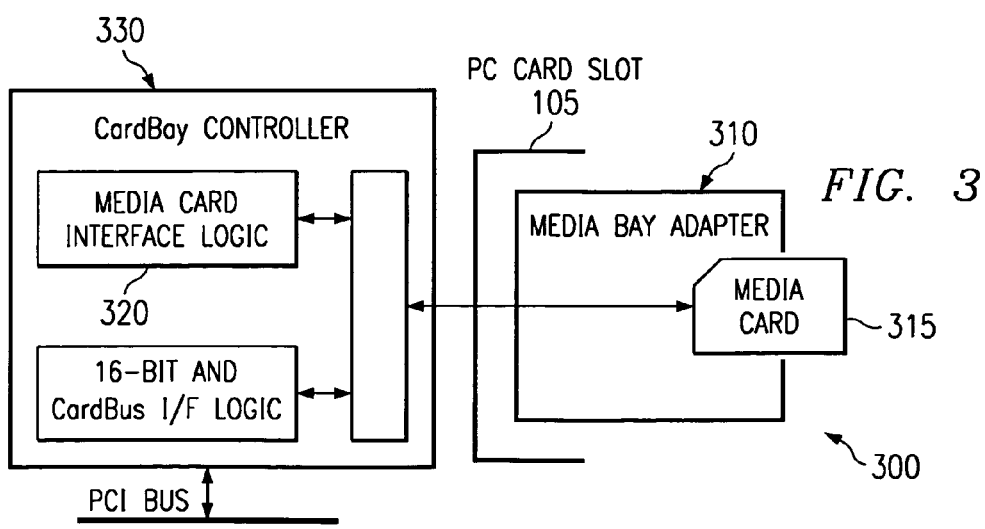
FIG. 3 diagrammatically illustrates a passive adaptor system with its media card logic on an existing PC card controller internal to a notebook computer in accordance with the art.
Figure 4:
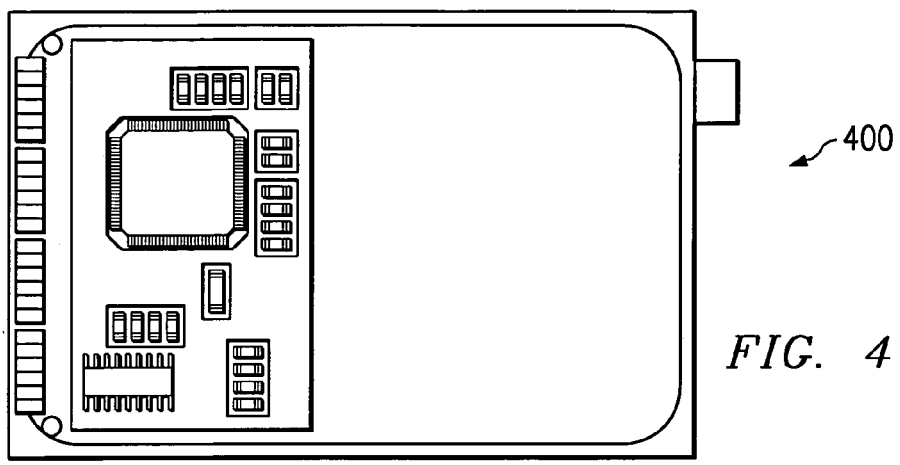
FIG. 4 diagrammatically illustrates a conventional PCMCIA card, with a portion of its casing removed, in accordance with the art.
Figure 5:
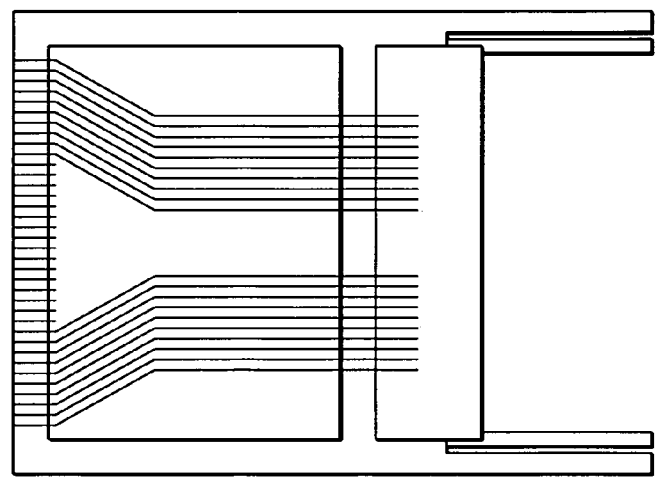
FIG. 5 diagrammatically illustrates a conventional passive adaptor in accordance with the art.
Figure 15:
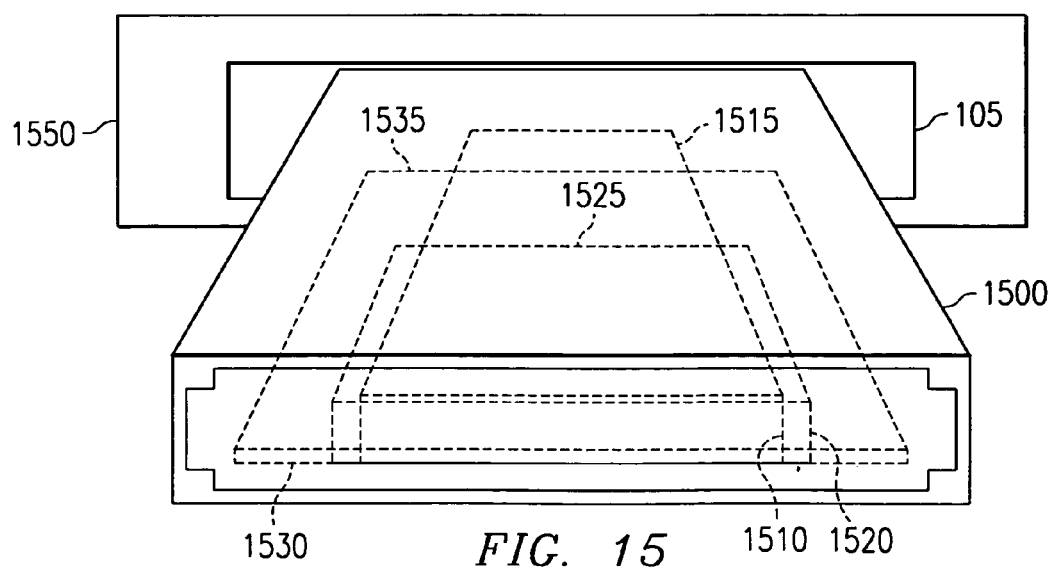
FIG. 15 diagrammatically illustrates an exemplary form factor for a passive adaptor in accordance with the present invention.

FIG. 15 diagrammatically illustrates an exemplary form factor for a passive adaptor in accordance with the present invention. Passive adaptor 1500 can be inserted into a card slot 105 (e.g., the same card slot as in FIGS. 1–3) of a host 1550, such as a laptop computer. Passive adaptor 1500 is capable of accommodating three (3) different types of media cards: Memory Stick, SD/MMC and SmartMedia. As shown in FIG. 15, a SmartMedia card would fit near the bottom of passive adaptor 1500 in position 1530. The connector (1003 in FIGS. 10 and 14) for a SmartMedia card would be approximately located along edge 1535 of position 1530. An SD/MMC card would fit on top of position 1530, in position 1520. The SD/MMC connector (1002 in FIGS. 10 and 14) would be approximately located along edge 1525 of position 1520. Finally, a Memory Stick card would fit on top of position 1520, in position 1510. The Memory Stick connector (1001 in FIGS. 10 and 14) would be approximately located along edge 1515 of position 1510.

Figure 16:
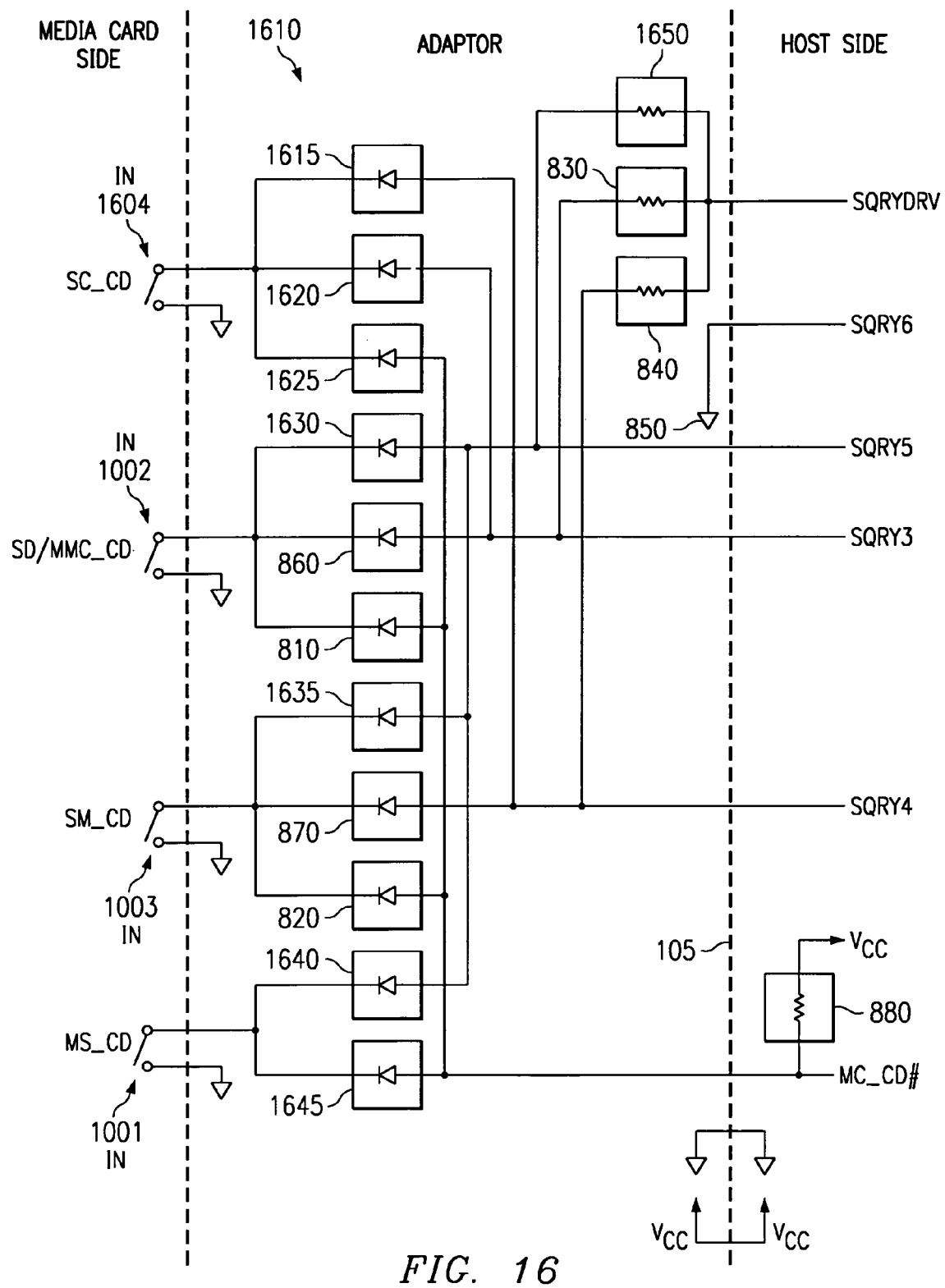
FIG. 16 diagrammatically illustrates an exemplary embodiment of a 5-to-1 card detection scheme in accordance with the present invention.

The exemplary embodiment of 4-to-1 card detection circuit 1410 (FIGS. 8 and 10–13) can be modified to include SmartCard ("SC") detection. FIG. 16 diagrammatically illustrates an exemplary embodiment of a 5-to-1 card detection circuit 1610 in accordance with the present invention. Circuit 1610 operates in the same manner as circuit 1410 (FIGS. 8 and 10–13). The main difference is that, in circuit 1610, SQRY5 is no longer tied to ground 850 and therefore can be driven high to allow for the proper configuration to indicate a SmartCard interface according to FIG. 6C. Resistor 1650 in the signal line from SQRYDRV to SQRY5 protects the host controller bus driver from shorts when the query pin is switched back to ground, similar to the functionality of resistors 830 and 840 (FIGS. 8, 10–13 and 16) with relation to SQRY3 and SQRY4, respectively. Diodes 1615, 1620, 1630, 1635, and 1640 in the signal lines between the query pins (i.e., SQRY3, SQRY4 and SQRY5) and the card insertion detect switches (i.e., SC_CD, SD/MMC CD, SM_CD and MS_CD) isolate the query pins, as do diodes 860 and 870 (FIGS. 8, 10–13 and 16). Diodes 1625 and 1645, in addition to diodes 810 and 820 (FIGS. 8, 10–13 and 16), connect the card insertion detect switches (i.e., SC_CD, SD/MMC_CD, SM_CD and MS_CD) to MC_CD#, providing the ability to drive MC_CD# low when a card is inserted (i.e., one of card insertion detect switches SC_CD, SD/MMC_CD, SM_CD or MS_CD is grounded).

Figure 17:
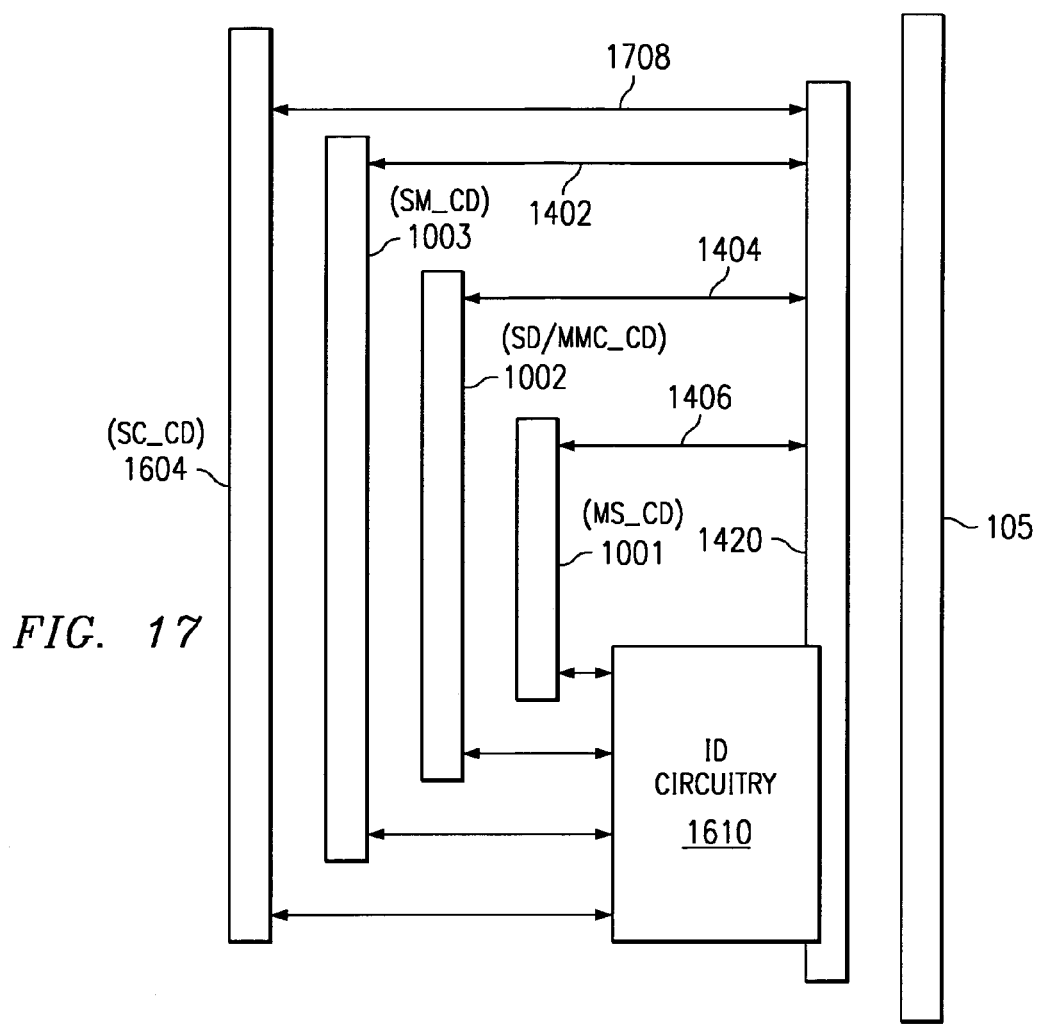
FIG. 17 diagrammatically illustrates an exemplary embodiment of a connection layout for 5-to-1 card detection scheme in accordance with the present invention.

FIG. 17 diagrammatically illustrates an exemplary embodiment of a connection layout for 5-to-1 card detection scheme in accordance with the present invention. As in FIG. 14, connector 1420 can functionally connect the passive adaptor of the invention into a card slot, such as slot 105, of the host computer. A SmartCard can be connected to the passive adaptor through corresponding media card connector 1604. As with connectors 1001, 1002 and 1003, connector 1604 may not be functionally compatible with the host computer connector 105, and therefore is interfaced to connector 105 by the aforementioned card detection circuitry 1610, by signal line 1708 and by connector 1420, which is cooperable with the host computer connector 105. Thus, the exemplary circuitry shown at 1610 and 1708 forms adaptor circuitry for interfacing the SmartCard to the host computer.

Figure 18:
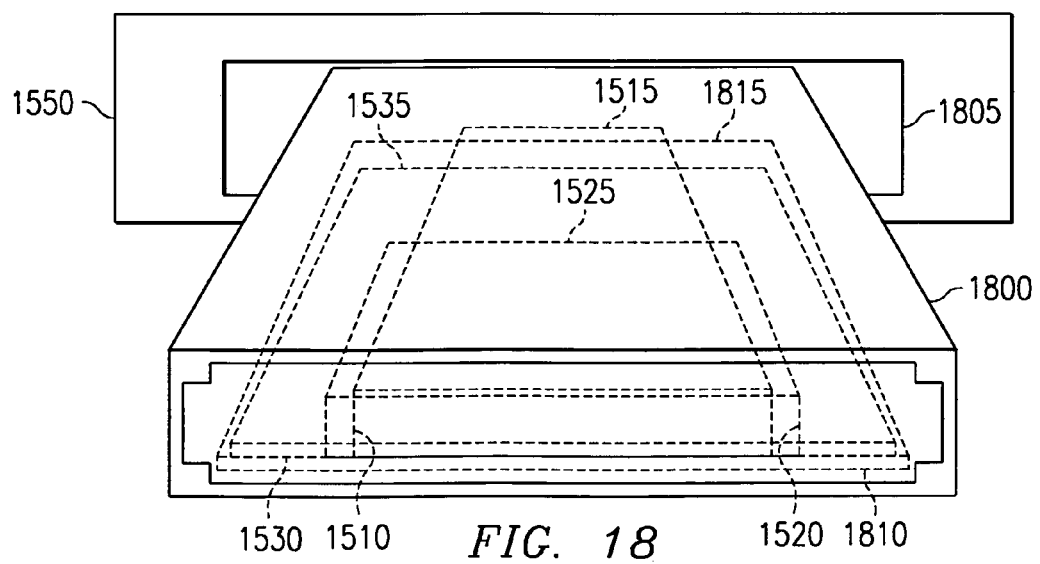
FIG. 18 diagrammatically illustrates an exemplary form factor for a passive adaptor in accordance with the present invention.

FIG. 18 diagrammatically illustrates an exemplary form factor for a passive adaptor in accordance with the present invention. Passive adaptor 1800 can be inserted into a card slot 105 (e.g., the same card slot as in FIGS. 1–3 and 15) of a host 1550, such as a laptop computer. Alternatively, due to the inclusion of a SmartCard, passive adaptor 1800 may be a Type III adaptor (i.e., a two (2) slot adaptor) that would then be inserted into a dual card slot 1805. Passive adaptor 1800 is capable of accommodating four (4) different types of media cards: SmartCard, Memory Stick, SD/MMC and SmartMedia. As shown in FIG. 18, a SmartCard in position 1810 would fit beneath a SmartMedia card in position 1530. The connector (1604 in FIGS. 16 and 17) for a SmartCard would be approximately located along edge 1815 of position 1810.

In the exemplary form factors as shown in FIGS. 15 and 18, it is contemplated that passive adaptors 1500 and 1800 can remain inserted in card slot 105 or 1805 while media cards are inserted and removed from passive adaptor 1500 and 1800. Of course, media cards can also be inserted and removed from passive adaptor 1500 and 1800 when they are not inserted in card slot 105 or 1805. Additionally, passive adaptor 1500 and 1800 are capable of accommodating a single media card at a time. Alternative form factors for a passive adaptor would allow media cards to be inserted in a variety of ways. For example, media cards could be inserted and removed from the sides of a passive adaptor. Another exemplary configuration for the passive adaptor is in the form of a card case, such that the passive adaptor opens to allow the insertion and removal of media cards. Then, the card case style passive adaptor can be inserted into a card slot of a host. In these configurations, the passive adaptor can be removed from the host card slot in order to enable access to the media card. Also contemplated is a passive adaptor form factor which is capable of accommodating multiple media cards at one time.

Figure 19:
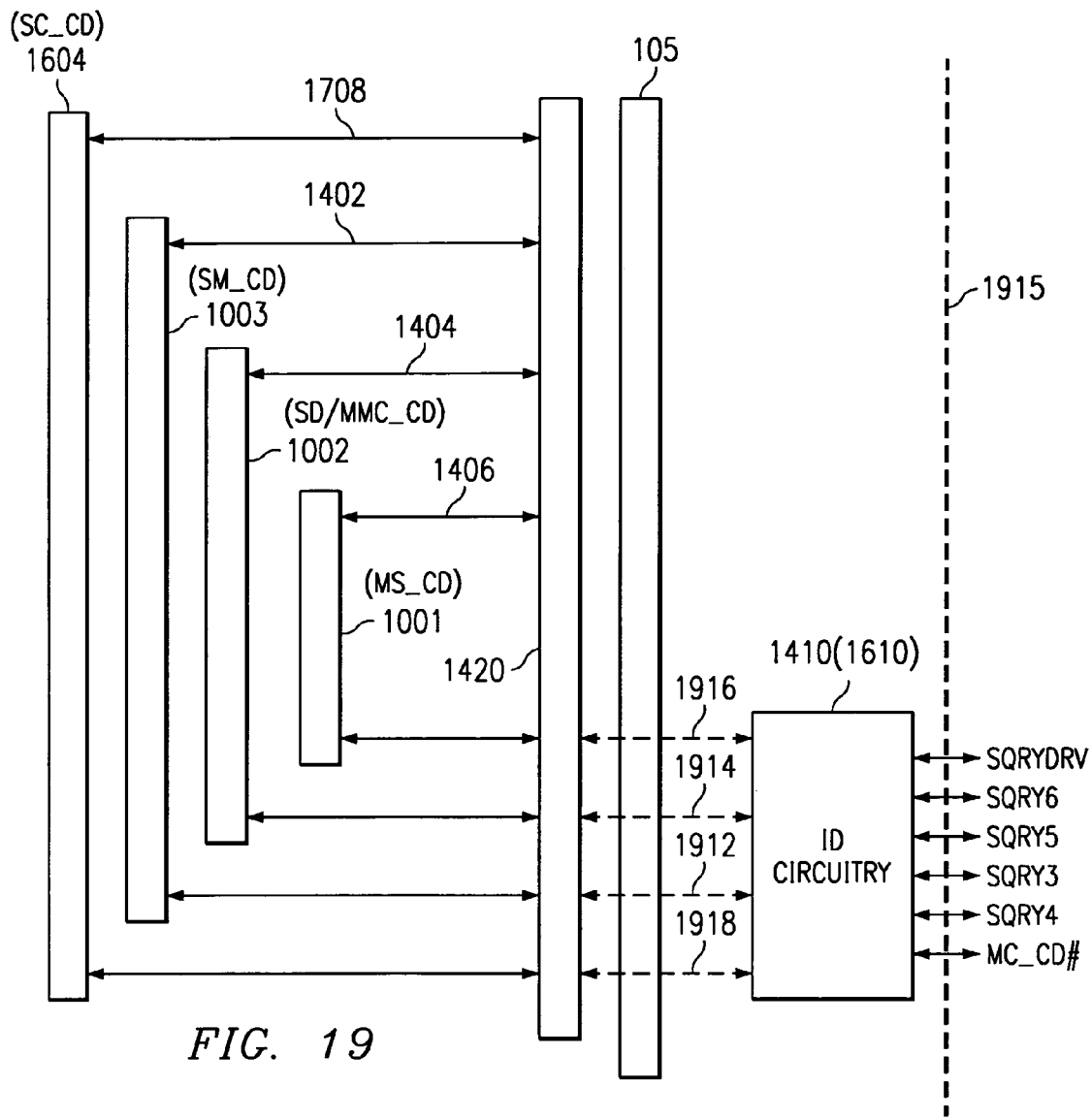
FIG. 19 diagrammatically illustrates an exemplary embodiment of a connection layout for 5-to-1 card detection scheme passive socket in accordance with the present invention.
Figure 20:
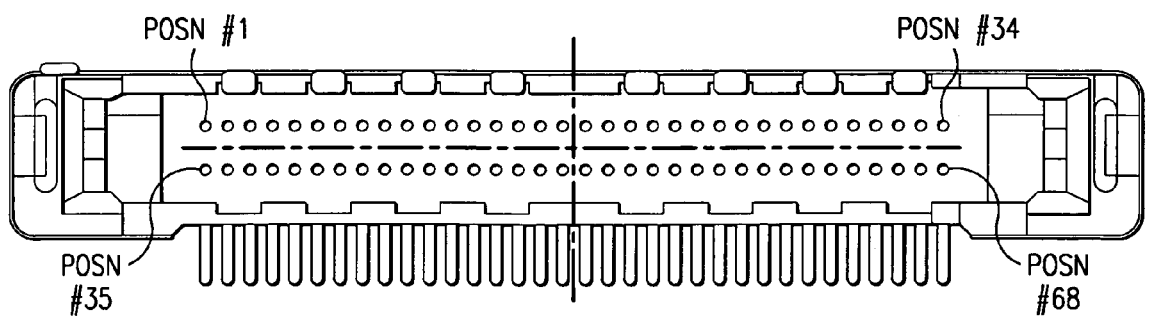
FIG. 20 illustrates a standard connector conforming to the PCMCIA standards.

In some embodiments, at least a portion of the passive adaptor can be integrated into the host. This integration can be accomplished in a number of ways, including permanently affixing a passive adaptor, such as passive adaptor 1500 and 1800 (FIGS. 15 and 18), in a card slot, such as 105 (FIG. 15) and 1805 (FIG. 18), of the host. The host-adaptor interface exists along the dotted line that coincides with card slot 105 in the exemplary embodiments illustrated in FIGS. 8, 10–13 and 16. In some embodiments of the present invention, ID circuitry 1410 (FIGS. 8, and 10–14) and 1610 (FIGS. 16 and 17) can be included in the host side (e.g., on the host controller), as illustrated in the exemplary embodiment of FIG. 19, leaving on a "passive socket" outside of the host. Because part of the adaptor (the ID circuitry) is provided within the host, the host-adaptor interface shown at 105 in FIGS. 8, 10–13 and 16 exists along the dotted line 1915 in FIG. 19. A passive socket used to enable connection between the media cards and the host can include connectors 1001, 1002, 1003 (FIGS. 14, 17 and 19) and 1604 (FIGS. 17 and 19), functionally connecting the media cards to the host through corresponding signal lines 1406, 1404, 1402 (FIGS. 14, 17 and 19) and 1708 (FIGS. 17 and 19). In some embodiments, the passive socket cannot be removed from the host. In some embodiments, the passive socket can be removable from the host. The removable passive socket includes a connector, such as connector 1420 which can be inserted into an existing card slot 105 or 1805 to enable connection from the media cards to the host. Connector 1420 can be, for example, a CardBus connector. The ID circuitry 1410 or 1610 can be connected to pins on connector 1420 through signal paths 1916, 1914, 1912 and 1918 available in card slot 105 (or 1805).

Although exemplary embodiments of the present invention have been described in detail, it will be understood by those skilled in the art that various modifications can be made therein without departing from the spirit and scope of the invention as set forth in the appended claims.

What is claimed is:

1. A passive socket for interfacing a plurality of types of media card with a host computer, comprising:

a plurality of media card connectors for respectively connecting a plurality of types of media cards to the passive socket, each of said plurality of connectors positioned within the passive socket to accommodate a configuration of the corresponding media card; and a host connector coupled to said media card connectors, said host connector for connection to a connector of the host computer that is functionally incompatible with said media card connectors and is coupled to identification circuitry that interfaces said media card connectors to said host computer when said host connector is connected to said connector of the host computer.

2. The passive socket of claim 1, wherein said connector of the host computer conforms to a PCMCIA standard.

3. The passive socket of claim 1, wherein said types of media card include one of Memory Stick, SD/MMC, SmartMedia and SmartCard.

4. The passive socket of claim 1, wherein, when said host connector is connected to said connector of the host computer, said identification circuitry and said media card connectors are cooperable for indicating to the host computer when one of said media card connectors is connected to the associated media card.

5. The passive socket of claim 4, wherein said one media card connector is cooperable with the associated media card, when connected thereto and when said host connector is connected to said connector of the host computer, for connecting a predetermined node of said identification circuitry to a predetermined voltage level.

6. The passive socket of claim 5, wherein said voltage level is approximately ground.

7. The passive socket of claim 4, wherein, when said host connector is connected to said connector of the host computer, said identification circuitry and said media card connectors are cooperable for indicating to the host computer which of said media card connectors is connected to the associated media card.

8. The passive socket of claim 7, wherein said one media card connector is cooperable with the associated media card, when connected thereto and when said host connector is connected to said connector of the host computer, for connecting a predetermined node of said identification circuitry to a predetermined voltage level.

9. The passive socket of claim 8, wherein said voltage level is approximately ground.

10. A computer system for interfacing with media cards, the system comprising:
   a host computer;
   a card slot in said host computer;
   a passive socket having a first connector connected in said card slot, and including a plurality of media card connectors functionally incompatible with said card slot and coupled to said first connector; and
   said host computer including identification circuitry coupled to said card slot for interfacing said host computer to a plurality of types of media card which respectively correspond to said media card connectors.

11. The computer system of claim 10, wherein said card slot conforms to a PCMCIA standard card slot.

12. The computer system of claim 10, wherein said card slot is a dedicated card slot.

13. The computer system of claim 10, wherein said types of media card include one of Memory Stick, SD/MMC, SmartMedia and SmartCard.

14. The computer system of claim 10, wherein said identification circuitry includes a first switching circuit coupled between first and second ones of said media card connectors.

15. The computer system of claim 14, wherein said first switching circuit includes a diode.

16. The computer system of claim 14, wherein said identification circuitry includes a second switching circuit coupled between said first media card connector and a third said media card connector.

17. The computer system of claim 16, wherein said first switching circuit includes a diode.

18. The computer system of claim 17, wherein said second switching circuit includes a diode.

19. In a data processing apparatus for interfacing with media cards, a computer comprising:
   a card slot;
   Identification circuitry coupled to said card slot for interfacing to a plurality of types of media card; and
   said card slot for connection to a passive socket having a first connector receivable in said card slot and a plurality of media card connectors which are coupled to said first connector and are functionally incompatible with said card slot.

20. The apparatus of claim 19, wherein said card slot conforms to a PCMCIA standard card slot.

21. The apparatus of claim 19, wherein said card slot is a dedicated card slot.

22. The apparatus of claim 19, wherein said types of media card include one of Memory Stick, SD/MMC, SmartMedia and Smartcard.

23. The apparatus of claim 19, provided as a personal computer.

* * * * *